| United States Patent [19] | [11] Patent Number: 4,987,194 |
| Maeda et al. | [45] Date of Patent: Jan. 22, 1991 |

[54] BLOCK COPOLYMERS AND COMPOSITION CONTAINING THE SAME

[75] Inventors: Miduho Maeda; Hideo Takamatsu; Masao Ishii; Shobu Minatono, all of Kashima, Japan

[73] Assignee: Kuraray Company, Limited, Kurashiki, Japan

[21] Appl. No.: 411,310

[22] Filed: Sep. 22, 1989

[30] Foreign Application Priority Data

Oct. 7, 1988 [JP] Japan .................................. 63-254657
Nov. 16, 1988 [JP] Japan .................................. 63-290952
May 15, 1989 [JP] Japan .................................. 1-122655

[51] Int. Cl.$^5$ ..................... C08F 297/04; B32B 15/08; B32B 27/00
[52] U.S. Cl. ..................................... 525/314; 428/462
[58] Field of Search .......................... 525/314; 428/462

[56] References Cited

FOREIGN PATENT DOCUMENTS 62-080037 4/1987 Japan .

*Primary Examiner*—Melvyn I. Marquis
*Assistant Examiner*—Vasu S. Jagannathan
*Attorney, Agent, or Firm*—Oblon, Spivak, McClelland, Maier & Neustadt

[57] ABSTRACT

A block copolymer having a numerical average molecular weight of 30,000 to 300,000 composed of two or more blocks consisting of aromatic vinyl units having a numerical average molecular weight of 2500 to 40,000, and one or more blocks containing a vinyl bonding content of not less than 40%, having a peak temperature of primary dispersion of tan δ at least 0° C., and consisting of isoprene or isoprene-butadiene units in which at least a part of carbon-carbon double bonds may be hydrogenated, and a composition consisting of the block copolymer. The composition can provide a vibration-damping material.

9 Claims, No Drawings

BLOCK COPOLYMERS AND COMPOSITION CONTAINING THE SAME

BACKGROUND OF THE INVENTION

1. Field of the Invention

This invention relates to new block copolymers having excellent vibration-damping properties and composition cotaining the same.

2. Description of the Prior Art

In recent years, according to the development of transporation facilities, noises and vibrations have been a significant social problem. In the precision machinery and electronics industries, the adverse effects of vibrations have been a serious problem. Consequently, vibration absorption and vibration-damping properties have been increasingly demanded.

As for vibration absorption and vibration-damping materials, metal springs, air springs, cork, felt, rubber vibration insulators and the like have been utilized. Among those, rubber vibration insulators have been widely adopted due to the form selectivity, low vibration transmisibility in high-frequency range, low cost etc. Hitherto diene rubbers such as neoprene rubbers, styrene-butadiene rubbers and the like have been well known as a vibration insulating rubber (Applied Acoustics vol. 11, pp 77–97 (1978)), but they are unsatisfactory both in vibration absorption and damping, and butyl rubbers have comparatively satisfactory properties in vibration absorption and damping, but are inferior in physical strength. Therefore, neither of them has been satisfied the requirements. All of these rubbers need the process of mixing various additives, vulcanizers and so on, vulcanizing by heat treatment after molding to represent strengths substantially, which requires a great deal of time and labor.

SUMMARY OF THE INVENTION

An object of the invention is to provide a thermoplastic elastomer for vibration dampers which has satisfactory physical strength and vibration-damping properties by molding without complicated vulcanization processes.

According to the invention, the above-mentioned problems are solved by providing a block copolymer having a number average molecular weight of 30,000 to 300,000 composed of two or more blocks consisting of aromatic vinyl units having a number average molecular weight of 2500 to 40,000, and one or more blocks containing a vinyl bond content of not less than 40, having a peak temperature of primary dispersion of tan δ at least 0° C., and consisting of isoprene or isoprene-butadiene units in which at least a part of carbon-carbon double bonds may be hydrogenated.

Block copolymers of the present invention have physical strengths equivalent to that of vulcanized rubbers without vulcanization forming pseudo-crosslinking points with aromatic vinyl blocks, and also have elastic properties due to isoprene or butadiene-isoprene blocks. The block copolymers can be processed in hot-melt state and easily molded.

DESCRIPTION OF THE PREFERRED EMBODIMENT

In accordance with the present invention, examples of the first component of the block copolymers are anionic polymerizable aromatic vinyl monomers such as styrene, 1-vinylnaphthalene, 2-vinylnaphthalene, 3-methylstyrene, 4-propylstyrene, 4-cyclohexylstyrene, 4-dodecylstyrene, 2-ethyl-4-benzylstyrene, 4-(phenylbutyl)styrene and the like, and more preferably styrene.

In accordance with the present invention, the second component of the block copolymers is isoprene or isoprene-butadiene. In this case of using monomers other than the above-mentioned, for instance, butadiene monomer alone is used, even with an increased vinyl bond content, the block copolymer obtained has a peak temperature, showing vibration-damping properties, of less than 0° C., and has insufficient properties in the usual application temperature range, thereafter it has no practical value.

In the case of using isoprene monomer, having a vinyl bond content in the range defined in the invention, the block copolymer obtained has a peak temperature in a practically applicable temperature range, about 0° to 50° C., which made it possible to be widely used in practice.

In the case of using isoprene-butadiene monomer, having a isoprene ratio of not less than 40%, the vibration-damping properties have been represented at least 0° C. Any type of copolymeriation, such as random, block or tapered can be applicable.

The vinyl bond content in the isoprene or isoprene-butadiene units of the block copolymers of the present invention is preferably not less than 40% (100% is also acceptable). Using the monomer containing a vinyl bond content of less than 40% is not preferable because the vibration-damping properties obtained are unsatisfactory in normal using temperature range.

The carbon-carbon double bonds in the blocks consisting of isoprene or isoprene-butadiene units may be partially hydrogenated. The block copolymers composed of blocks in which a part of carbon-carbon double bonds are hydrogenated have the features of improved heat-resistance and weatherability. The hydrogenation rate may be selected according to the needs of heat-resistance and weatherability, normally 50% or more, preferably 70% or more, and more preferably 80% or more in the case of higher needs.

Also the peak temperature of primary dispersion of tan δ (loss tangent) of blocks consisting of isoprene or isoprene-butadiene units obtained by the viscoelasticity determination of the block copolymers must be at least 0° C. When the peak temerature is less than 0° C., the vibration-damping properties are unsatisfactory in the normal temperature range. The absorption temperature of tan δ is 60° C. when the vinyl bond content of isoprene block is 100%, therefore the possible upper limit of the peak temperature is 60° C.

The molecular weight of the block copolymers is 30,000 to 300,000. When the molecular weight is less than 30,000, the block copolymers have inferior mechanical properties, such as tenacity and elongation at breakage. When the molecular weight is more than 300,000, the processability declines. From these points, the molecular weight of the block copolymers is preferably 80,000 to 250,000.

The molecular weight of aromatic vinyl block is in the range of 2500 to 40,000. When it is less than 2500, the mechanical properties of the block copolymers decline, and when it is more than 40,000, the melt viscosity becomes too high and the thermoplasticity is unfavorably degraded.

The proportion of aromatic vinyl blocks in the block polymers is preferably 5 to 50% by weight. When the proportion is less than 5% by weight, the strength of the block copolymers becomes unsatisfactory, and when the proportion is more than 50% by weight, the processing becomes difficult due to an extreme increase in melt viscosity and the vibration-damping properties undesirably deteriorated.

The molecular weight of isoprene or isoprene-butadiene blocks is preferably in the range of 10,000 to 200,000. When the molecular weight is less than 10,000, the block copolymers lose in rubber elasticity, and when the molecular weight is more than 200,000, the block copolymers degrade in processability due to an extreme increase in melt viscosity.

The sequences of the block copolymers of the invention are shown as A(BA)n or (AB)n, wherein A represents a block consisting of aromatic vinyl monomer, B represent a block consisting of isoprene or isoprene-butadiene, and n is an integer of one or more. There is no upper limit of n, but n is preferably 10 or less.

The block copolymers of the invention can be prepared in various processes. Some of them are the process consisting of a successive polymerization of aromatic vinyl compound and isoprene or isoprene-butadiene with the initiator of an alkyl lithium compound, the process consisting of the polymerization of aromatic vinyl monomer and of isoprene or isoprene-butadiene respectively, and the coupling of the aromatic vinyl polymer to the isoprene or isoprene-butadiene polymer with a coupling agent, the process consisting of a successive polymerization of isoprene or isoprene-butadiene and aromatic vinyl compound with a dilithium compound as the initiator, and the like.

Examples of alkyl lithium compounds are those having an alkyl group with carbon number of 1 to 10, particularly methyl lithium, ethyl lithium, pentyl lithium, butyl lithium are preferable.

Examples of coupling agents are dichloromethane, dibromomethane, dichloroethane, dibromoethane and the like.

Examples of dilithium compounds are naphthalene dilithium, oligostyryl dilithium, dilithium hexylbenzene and the like.

The amounts of reagents used are 0.01 to 0.2 part by weight for each initiator, and 0.04 to 0.8 part by weight for the coupling agent per 100 parts by weights of whole monomers used for polymerization.

For the preparation of the blocks consisting of isoprene or isoprene-butadiene units containing a vinyl bonding content of not less than 40%, and having a peak temperature of primary dispersion of tan δ at least 0° C. as microstructure, a Lewis base is employed as a co-catalyst for the polymerization of isoprene or isoprene-butadiene compound.

Examples of Lewis bases are ethers such as dimethyl ether, diethyl ether, methylethyl ether, tetrahydrofuran and the like, glycol ethers such as ethylene glycol diethyl ether, ethylene glycol dimethyl ether and the like, tertiary amines such as N, N, N', N'-tetramethyl ethylene diamine (TMEDA), triethylene diamine and the like, amines containing ether bonding, such as N-methyl morpholine, N-ethyl morpholine and the like. The amount of the Lewis base used is 0.1 to 400 parts per 100 parts by weight of initiator.

It is known that the anionic polymerization of isoprene using ethylene glycol dialkyl ether as co-catalyst gives polyisoprene having a vinyl bond content of not less than 70% applicable to cushioning element. (European Patent Laid-open No. 248,175). Although the polyisoprene has cushioning properties, the polymer, as it is, does not exhibit elastic properties and shows plastic deformation when stressed, therefore the polymer should be cross-linked for using as a vibration-damping material, which are experimentally acertained by the inventors.

In the polymerization of isoprene or isoprene-butadiene compounds, inactive solvents are employed. Hydrocarbons having a carbon number of 6 to 12, such as hexane, heptane, octane, decane and their cyclic analogues are preferably employed. Examples of aromatic solvents include toluene, benzene, xylene and the like.

In any type of polymerization reaction, the polymerization temperatures is $-20°$ to $80°$ C. and the polymerization periods are 1 to 50 hours.

The block copolymer can be obtained by pouring the polymer solution into a poor solvent, such as methanol to separate by precipitation, followed by drying by heat or in vacuum, or adding the polymer solution dropwise into boiling water to remove the solvent azeotropically, followed by drying by heat or in vacuum.

The carbon-carbon double bonds in the blocks consisting of isoprene or isoprene-butadiene units can be hydrogenated by a well-known method. The process of hydrogenating the block copolymer dissolved in an inert solvent which is inactive to the hydrogenation reaction and the catalyst by contacting with molecular hydrogen is recommended.

Examples of hydrogenation catalysts are Raney nickel catalysts, heterogeneous catalysts consisting of metals, such as Pt, Pd, Ru, Rh, Ni or the like on carriers, such as carbon, alumina, diatomaceous earth or the like, or Ziegler type catalysts consisting of transition metals with alkyl aluminum compounds, alkyl lithium compounds or the like. The hydrogenation reaction is carried out at a hydrogen pressure of normal to 200 kg/cm$^2$, at a temperature of room temperature to 250° C., for a period of 1 to 100 hours.

The hydrogenated block copolymer can be obtained by pouring the polymer solution into a poor solvent, such as methanol to separate by precipitation followed by drying by heat or in vacuum, or adding the polymer solution dropwise into boiling water to remove the solvent azeotropically, followed by drying by heat or in vacuum.

The block copolymers of the present invention is thermoplastic and easily processed in hot-melt state. That is to say, the polymer is kneaded in a kneader or the like and press molded, or milled in a extruder and extrusion molded to give moldings after cooling.

The block copolymers of the present invention can be molded and used alone, but in some cases it may be blended with other polymers without departing from the spirit and scope of the invention.

Examples of other polymers blended to the polymer of the invention are NR, IR, BR, SBR, EPDM, EPR, butyl rubber, isoprene rubber, butadiene rubber, isoprene-butadiene copolymer in lower molecular weights, thermoplastic resins such as aromatic vinyl monomer-conjugated diene block copolymer, ethylene-vinyl acetate copolymer, polyamide, polyester and the like, thermoplastic polyurethane etc. The amount of blending of these polymers is preferably not more than 20 parts per 100 parts of the block copolymer of the invention.

The block polymer of the invention can be admixed with additives commonly used for rubber. Examples of the additives are tackifiers, plasticizers, softeners used as process oil, reinforcing agents such as carbon black, silica and the like, fillers such as calcium carbonate, talk, mica and the like. The addition of a tackifier having a softening temperature of at least 30° C. improves its adhesive properties, so that its addition is prefered.

Examples of such tackifiers are terpene resins, terpene-phenol resins, rosins, hydrogenated rosins, synthetic polyterpens, aromatic hydrocarbons, and petroleum hydrocarbon resins such as alicyclic hydrocarbon and the like. When the softening temperature of a tackifier is less than 30° C., the composition blended thereof have unfavorably lower physical strengths and adhesive properties. On the other hand, mica favorably improves vibration-damping properties.

The preferable amounts of additives are 5 to 250 parts by weight for tackifiers, 5 to 250 parts by weight for plasticizers and softeners, 20 to 200 parts by weight for reinforcing agents, and 20 to 300 parts by weight for fillers per 100 parts by weight of the block copolymers of the invention. For admixing these tackifiers, the hot-melt processing as mentioned above can be applied.

The block copolymers of the present invention may be used with cross-linkings. Examples of cross-linking agents are sulfur, peroxide and the like. Cross-linking reaction can be easily attained by a usual method with a common apparatus used for the reaction. The amounts of cross-linking agents are 0.5 to 20 parts by weight in case of sulfur, 0.1 to 20 parts by weight in case of peroxide per 100 parts by weight of the block copolymer of the invention.

The block copolymers of the present invention and the compositions containing the same can be applied as moldings thereof, coatings on fabric, simple coverings on a plate of metal, hard plastics, elastomer, sandwitch structures inserted between two plates of the above mentioned.

Examples of metals include iron, steel, aluminum and the like, examples of hard plastics include polystyrene, acrylic resins, ABS resins and the like, and example of elastomers include polyethylene, polypropylene, polyvinyl chloride and the like.

The block copolymer of the present invention can be used blended with various plastics in addition to basically used. Examples of particularly preferable plastics include polyolefins, polyamides, polystyrene, polyesters, ABS resins, polycarbonates.

In general, the amount of blending to these plastics is preferably not more than 50% by weight. The blending of the polymer of the invention can be accomplished by a usual way, and which provides vibration-damping properties to the plended plastics. The blended plastics can be preferably applied for casings, various parts etc.

Examples of the present invention are described below.

In the following Examples, measurements were made as follows.

The molecular weight was measured by GPC method.

The microstructure was measured by NMR spectrum. The contents of 3,4-bonding and 1,2-bonding were obtained as the ratios of the peak at $\delta$ 4.8 ppm for 3,4-bonding and that at $\delta$ 5.8 ppm for 1,2-bonding to that at $\delta$ 5.3 ppm for 1,4-bonding.

The proportion of hydrogenation was obtained as the ratio of iodide-values of the block copolymer before and after the hydrogenation.

The peak temperature of tan $\delta$ was obtained by viscoelastic determination with a RHEOVIBRON apparatus (made by ORIENTEC Corp).

The loss factor $\eta$ representing vibration-damping properties was obtained by resonance method observing the resonance degree of the test-piece that was prepared by coating the composition on a steel plate with a thickness of 1 mm. The measurement was undertaken at 500 Hz and 25° C.

EXAMPLE 1

In a pressure proof reactor vessel, dried and replaced with nitrogen gas, 480 g of cyclohexane as a solvent, 0.6 ml of n-BuLi as a catalyst, 0.18 ml of TMEDA as a vinylation reagent were placed and heated up to 50° C., thereafter 12 g of styrene monomer, 96 g of isoprene monomer, 12 g of styrene monomer were successively added in this order to polymerize. The polymerization temperatures were 50° C. for styrene and 30° C. for isoprene.

After the polymerization, the reaction mixture was poured into a large quantity of methanol. The formed precipitates were collected and dried in vacuum to give block copolymer (A). The block copolymers (B), (C) and (D) were prepared in the same manner as described above according to the formulations shown in Table 1. The molecular characteristics of the obtained block copolymers (A), (B), (C) and (D) are also shown in Table 1.

TABLE 1

| Block Copolymer | (A) | (B) | (C) | (D) |
|---|---|---|---|---|
| Cyclohexane (g) | 480 | 480 | 480 | 480 |
| TMEDA (ml) | 0.18 | 0.18 | 0.18 | 0.06 |
| n-BuLi (ml) | 0.6 | 0.6 | 0.6 | 0.6 |
| Styrene monomer (g) | 12 | 4 | 12 | 12 |
| Isoprene monomer (g) | 96 | 96 | 48 | 96 |
| Butadiene monomer (g) | — | — | 48 | — |
| Styrene monomer (g) | 12 | 4 | 12 | 12 |
| Molecular weight (Mn) ($\times 10^5$) | 1.96 | 1.85 | 21.0 | 1.93 |
| Molecular weight of Styrene block (Mn) ($\times 10^3$) | 10.3 | 3.30 | 10.7 | 9.9 |
| Vinyl bond content in Isoprene block (%) | 80.3 | 80.9 | 79.6 | 43.8 |
| Peak temperature of tan $\delta$ (°C.) | 40.5 | 40.6 | 40.4 | 0.8 |

Comparative Example 1

Block copolymers (E) and (F) were prepared by the polymerization in the same manner as Example 1 according to the formulations shown in Table 2. The molecular characteristics of the obtained copolymer (E) and (F) are also shown in Table 2.

TABLE 2

| Block Copolymer | (E) | (F) |
|---|---|---|
| Cyclohexane (g) | 480 | 480 |
| TMEDA (ml) | 0.18 | 0.18 |
| n-BuLi (ml) | 0.6 | 0.6 |
| Styrene monomer (g) | 60 | 12 |
| Isoprene monomer (g) | 96 | 200 |
| Butadiene monomer (g) | 60 | 12 |
| Molecular weight (Mn) ($\times 10^5$) | 2.96 | 3.91 |
| Molecular weight of Styrene block (Mn) ($\times 10^3$) | 49.4 | 10.4 |
| Vinyl bond content in Isoprene block (%) | 79.5 | 78.3 |
| Peak temperature of tan $\delta$ (°C.) | 41.0 | 39.5 |

EXAMPLE 2

Tensile properties and rebound resiliences were measured for the block copolymers obtained in Example 1 and Comparative Example 1, and the styrene-isoprene-styrene block copolymer (G) (Cariflex TR-1107 made by SHELL Corp., molecular weight $1.76 \times 10^3$, molecular weight of styrene block $9.8 \times 10^3$) having a vinyl bond content of 8%. Test pieces were prepared by press-molding at 200° C. and measured according to the method of JIS K-6301.

Among these block copolymers, block copolymer (E) and (F) cannot be molded into uniform test pieces due to the inferior flowabilities. The test results are shown in Table 3.

As is clear from Table 3, the block copolymers of the present invention (A), (B), (C) and (D) have an excellent strength and elongation, and also a lower rebound resilience which predicts higher vibration-damping properties.

The block copolymer (E) having a higher molecular weight of styrene block, and the block copolymer (F) having a higher molecular weight were inferior in moldability. The block copolymer (E) has a higher $T_B$ and a lower $E_B$. The block copolymer (F) has an unsatisfactory $T_B$. The block copolymer (G) has a satisfactory $T_B$ and $E_B$, but a higher rebound resilience, which predicts lower vibration-damping properties.

TABLE 3

| Block Copolymer | M300 | $T_B$ | $E_B$ | $H_S$ | Rebound | Source |
|---|---|---|---|---|---|---|
| (A) | 24 | 209 | 640 | 67 | 4 | Present Inv. |
| (B) | 14 | 210 | 730 | 62 | 5 | Present Inv. |
| (C) | 40 | 190 | 550 | 70 | 7 | Present Inv. |
| (D) | 14 | 201 | 890 | 51 | 15 | Present Inv. |
| (E) | 59 | 300 | 190 | 80 | 9 | Comp. Exam. |
| (F) | 16 | 103 | 490 | 60 | 6 | Comp. Exam. |
| (G) | 10 | 215 | 1250 | 42 | 65 | Comp. Exam. |

Note:
M300: Stress at 300% elongation (kg/cm$^2$)
$T_B$: Tensile tenacity at break (kg/cm$^2$)
$E_B$: Elongation at break (%)
$H_S$: Relative resilience to the indenter point or ball pressed on the surface of rubber test piece measured by JIS-A type hardness tester
Rebound: Rebound resilience (%)
Present Inv.: Present Invention
Comp. Exam.: Comparative Example

Comparative Example 2

A polyisoprene having a higher vinyl bond content consisting of isoprene alone was prepared by the polymerization in the same manner as Example 1 according to the formulation shown in Table 4. The molecular characteristics of the polymer are shown in Table 4. Tensile properties and rebound resilience were measured for the polymer as Example 2, and the results are also shown in Table 4. The obtained polymer has a good flowability but an inferior rubber elasticity.

TABLE 4

| | |
|---|---|
| Cyclohexane (g) | 480 |
| TMEDA (ml) | 0.18 |
| n-BuLi (ml) | 0.6 |
| Isoprene monomer (g) | 120 |
| Molecular weight (Mn) ($\times 10^5$) | 2.18 |
| Vinyl bond content in Isoprene block (%) | 78.5 |
| Peak temperature of tan δ (°C.) | 39.5 |
| Physical Properties | |
| M300 (kg/cm$^2$) | 19 |
| $T_B$(kg/cm$^2$) | 18 |

TABLE 4-continued

| | |
|---|---|
| $E_B$ (%) | 350 |
| $H_S$ | 5 |
| Rebound (%) | 9 |

EXAMPLE 3

In a pressure proof vessel, dried and replaced with nitrogen gas, 480 g of cyclohexane as a solvent, 0.6 ml of n-BuLi as a catalyst and 0.18 ml of TMEDA as a vinylation agent were placed and heated to 50° C., thereafter 12 g of styrene monomer, 96 g of isoprene monomer, 12 g of styrene monomer were successively added in this order and polymerized. The polymerized mixture was treated with methanol and the copolymer was recovered.

The copolymer was dissolved in 500 ml of cyclohexane, to which was added 5% of Pd—C (Pd 5%) as a hydrogenation catalyst, and the reaction mixture was hydrogenated at a hydrogen pressure of 20 kg/cm$^2$ and at 150° C. After the hydrogenation, the catalyst was removed by filtration, and the resultant was vacuum dried to give the block copolymer (H).

The obtained block copolymer has a molecular weight of 18,900, a molecular weight of polystyrene block of 9800, a total percentage of 3,4- and 1,2-bonding of 79.8%, a proportion of hydrogenation of 91.5% and the peak temperature of tan δ was 39.8° C.

EXAMPLE 4

The procedures of Example 3 were repeated except that instead of 12 g of styrene monomer and 96 g of isoprene monomer, there were used 16 g of styrene monomer and 120 g of isoprene monomer, respectively, thereby obtained the block copolymer (I).

The obtained block copolymer (I) has a molecular weight of 135,000, a molecular weight of styrene block of 8500, a total percentage of 3,4- and 1,2-bonding of 73.4%, a proportion of hydrogenation of 78.2% and the peak temperature of tan δ was 36.8° C.

EXAMPLE 5

The procedures of Example 3 was repeated except that instead of 0.6 ml of n-BuLi and 0.18 ml of TMEDA, there were used 1.5 ml of n-BuLi and 0.1 ml of TMEDA, respectively, thereby obtained the block copolymer (J).

The obtained block copolymer (J) has a molecular weight of 95,000, a molecular weight of styrene block of 5200, a total percentage of 3,4- and 1,2-bonding of 61.3%, a proportion of hydrogenation of 66.5% and the peak temperature of tan δ was 25.1° C.

EXAMPLE 6

The block copolymer (H) obtained in Example 3 and the block copolymer (K) obtained by the same procedures of Example 1 without hydrogenation (having a molecular weight of 176,000, a molecular weight of polystyrene block of 10,000, a molecular weight of polyisoprene block of 151.000, a total percentage of vinyl bond of 79.9%) were formed into a sheet having a thickness of 2 mm. The sheets were heat-treated at 200° C. for 30 min, and the physical properties of the sheets were measured before and after the test for evaluating their thermal aging resistance.

The results are shown in Table 5. The block copolymer (H) has an excellent thermal resistance showing little change in physical properties before and after the thermal aging test.

TABLE 5

| Block Copolymer<br>Tenacity and Elongation | (H) | (K) |
| --- | --- | --- |
| Before Thermal Aging Test | | |
| Tenacity (kg/cm$^2$) | 198 | 179 |
| Elongation (%) | 680 | 710 |
| After Thermal Aging Test | | |
| Tenacity (kg/cm$^2$) | 189 | 49 |
| Elongation (%) | 660 | 250 |

EXAMPLE 7

The block copolymer (H), (I) and (J) obtained in Examples 3–5 were measured in rebound resilience at room temperature to evaluate the vibration-damping performances.

The results are shown in Table 6. It is clear that the block copoymers and the compositions consisting of the polymers have excellent vibration-damping properties.

TABLE 6

| Block Copolymer | (H) | (I) | (J) |
| --- | --- | --- | --- |
| Rebound Resilience (%) | 7 | 5 | 6 |

EXAMPLE 8

Compositions were prepared by kneading block copolymer (A) and (H) obtained in Example 1 and 3 respectively, at 180° C. according to the formulations as described in Table 7.

Rebound resilience and adhesive force to steel plate were observed. The shear adhesive force was measured with a sandwich prepared by coating the composition hot-melted at 160° C. on a degreased steel plate at an area of 5×5 cm and in a thickness of 0.5 mm, inserting the layer under hot-molten state between the steel plate and another steel plate, and cooling to room temperature, by a INSTRON tensile tester at a speed of 30 cm/min.

The results were shown in Table 7. It is clear that the compositions according to the present invention have lower rebound resiliences, consequently superior vibration-damping properties, and also sufficient adhesive forces to steel plate.

TABLE 7

| | | |
| --- | --- | --- |
| Block Copolymer (A) | 100 | |
| Block Copolymer (H) | | 100 |
| Tackifier$^{(1)}$ | 50 | 50 |
| Anti-aging agent$^{(2)}$ | 0.1 | 0.1 |
| Rebound Resilience (%) | | |
| at 25° C. | 11 | 10 |
| at 50° C. | 9 | 8 |
| Adhesive Force (kg/cm$^2$) | 46 | 51 |

Note:
$^{(1)}$Aliphatic cyclic hydrocarbon resin (Softening temperature 100° C.): Arakawa Chemical Industries, Ltd. Arcon P-100
$^{(2)}$Tetrakis-[methylene-3-(3′,5′-tert-butyl-4-hydroxyphenyl)-propionate]-methane: CIBA-GEIGY Limited, Irganox 1010

EXAMPLE 9

Various compositions were prepared by using block copolymer (A) and (H) obtained in Example 1 and 3 respectively, and kneading at 220° C. according to the formulations as described in Table 8, and the rebound resiliences were measured. It is clear that any one of compositions has a lower rebound resilience, consequently superior vibration-damping properties.

TABLE 8

| | | | | | | | | |
| --- | --- | --- | --- | --- | --- | --- | --- | --- |
| Block Copolymer (A) | 100 | 100 | 75 | 75 | | | | |
| Block Copolymer (H) | | | | | 100 | 100 | 75 | 75 |
| Ethylene-Vinyl acetate Copolymer$^{(1)}$ | | 25 | | 25 | | | 25 | 25 |
| Mica$^{(2)}$ | 30 | | 50 | 30 | 30 | 50 | | 30 |
| Rebound Resilience (%) | | | | | | | | |
| at 25° C. | 4 | 3 | 7 | 3 | 6 | 4 | 5 | 3 |
| at 50° C. | 7 | 5 | 7 | 3 | 7 | 5 | 5 | 5 |

Note:
$^{(1)}$DuPont-Mitsui Polychemicals Co., Ltd. EVAFLEX 250
$^{(2)}$Marietta Resources International Ltd. Suzolite 150S

What is claimed is:

1. A block copolymer having a number average molecular weight of 30,000 to 300,000 composed of at least two blocks consisting of aromatic vinyl units each having a number average molecular weight of 2,500 to 40,000 and at least one block containing a vinyl bond content of not less than 40%, having a peak temperature of primary dispersion of tan δ of at least 0° C., and consisting of isoprene or isoprene-butadiene units in which at least a portion of the carbon-carbon double bonds may be hydrogenated.

2. The block copolymer according to claim 1, wherein at least one of the blocks formed of isoprene or isoprene-butadiene units has a number average molecular weight of 10,000 to 200,000.

3. The block copolymer according to claim 1, wherein the proportion of blocks consisting of aromatic vinyl units range from 5 to 50% by weight of the block copolymer.

4. The block copolymer according to claim 1, wherein the sequence of blocks in the copolymer is A(BA)n or (AB)n, in which A is a block consisting of aromatic vinyl units, B is a block consisting of isoprene or isoprene-butadiene units and n is an integer of one or more.

5. The block copolymer according to claim 1, wherein the carbon-carbon double bonds in the blocks consisting of isoprene or isoprene-butadiene units are hydrogenated in amount of at least 50%.

6. A composition consisting of 100 parts by weight of a block copolymer having a number average molecular weight of 30,000 to 300,000 composed of at least two blocks consisting of aromatic vinyl units each having a number average molecular weight of 2,500 to 40,000 and at least one block containing a vinyl bond content of not less than 40%, having a peak temperature of primary dispersion of tan δ of at least 0° C., and consisting of isoprene or isoprene-butadiene units in which at least a portion of the carbon-carbon double bonds may be hydrogenated, and 5 to 250 parts by weight of a tackifier having a softening temperature of at least 30° C.

7. A vibration-damping material which comprises a block copolymer having a number average molecular weight of 30,000 to 300,000 composed of at least two blocks consisting of aromatic vinyl units each having a number average molecular weight of 2,500 to 40,000, and at least one block containing a vinyl bond content of not less than 40%, having a peak temperature of primary dispersion of tan δ of at least 0° C., and consisting of isoprene or isoprene-butadiene units in which at least a portion of the carbon-carbon double bonds may be hydrogenated.

8. A support having a layer of a material which comprises a block copolymer having a number average molecular weight of 30,000 to 300,000 composed of at least two blocks consisting of aromatic vinyl units each having a number average molecular weight of 2,500 to 40,000, and at least one block containing a vinyl bond content of not less than 40%, having a peak temperature of primary dispersion of tan δ of at least 0° C., and consisting of isoprene or isoprene-butadiene units in which at least a portion of the carbon-carbon double bonds may be hydrogenated.

9. A sandwich structure which comprises two support plates and sandwiched therebetween a material which comprises a block copolymer having a number average molecular weight of 30,000 to 300,000 composed of at least two blocks consisting of aromatic vinyl units each of which has a number average molecular weight of 2,500 to 40,000 and at least one block containing a vinyl bond content of not less than 40%, having a peak temperature of primary dispersion of tan δ of at least 0° C., and consisting of isoprene or isoprene-butadiene units in which at least a portion of the carbon-carbon double bonds may be hydrogenated.

* * * * *